(12) United States Patent
Robinson et al.

(10) Patent No.: US 8,471,146 B2
(45) Date of Patent: Jun. 25, 2013

(54) BREAKER TRAY FOR A PANELBOARD COVER

(75) Inventors: Kristopher Scott Robinson, Atlanta, GA (US); Jeffrey Kenton Hudgins, Jr., Gainesville, GA (US)

(73) Assignee: Siemens Industry, Inc., Alpharetta, GA (US)

( * ) Notice: Subject to any disclaimer, the term of this patent is extended or adjusted under 35 U.S.C. 154(b) by 283 days.

(21) Appl. No.: 13/022,011

(22) Filed: Feb. 7, 2011

(65) Prior Publication Data
US 2011/0192628 A1    Aug. 11, 2011

Related U.S. Application Data

(60) Provisional application No. 61/302,287, filed on Feb. 8, 2010.

(51) Int. Cl.
*H02G 3/04* (2006.01)
(52) U.S. Cl.
USPC ............... 174/66; 174/67; 220/241; 220/242
(58) Field of Classification Search
USPC .................. 174/50, 66, 67, 58, 38, 68.2, 135; 220/3.2–3.9, 4.02, 241, 242; 439/535, 536
See application file for complete search history.

(56) References Cited

U.S. PATENT DOCUMENTS

| | | | | |
|---|---|---|---|---|
| 3,743,892 A | * | 7/1973 | Fritz et al. | 174/67 |
| 5,072,071 A | * | 12/1991 | Cassity et al. | 174/135 |
| 5,343,356 A | * | 8/1994 | Hancock | 174/68.2 |
| 5,898,130 A | * | 4/1999 | Tansi et al. | 174/66 |
| 5,902,960 A | * | 5/1999 | Smith | 174/66 |
| 5,961,345 A | * | 10/1999 | Finn et al. | 439/536 |
| 6,422,898 B1 | * | 7/2002 | Harvey et al. | 439/536 |
| 6,867,370 B2 | * | 3/2005 | Compagnone, Jr. | 174/58 |
| 7,361,832 B2 | * | 4/2008 | Dively | 174/38 |
| 8,027,154 B2 | * | 9/2011 | Gatti et al. | 174/50 |

* cited by examiner

*Primary Examiner* — Angel R Estrada

(57) ABSTRACT

A cover for use with a panelboard enclosure. The cover includes a cover element for mounting onto a panelboard enclosure. The cover element includes an insert for insertion into a cover opening. A plate section is attached to the insert along peripheral edges of the plate section by a thin wall section to form a cover suitable for use with a main lug panelboard configuration. The thin wall section is sized relative to the plate section to enable separation of the plate section from the insert by a user to then form a cover suitable for use with a main breaker panelboard configuration.

18 Claims, 7 Drawing Sheets

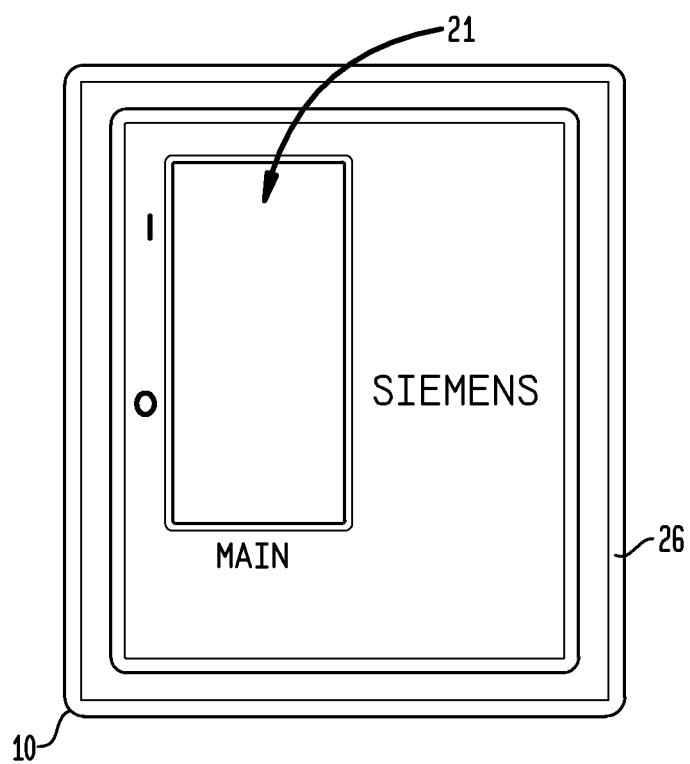

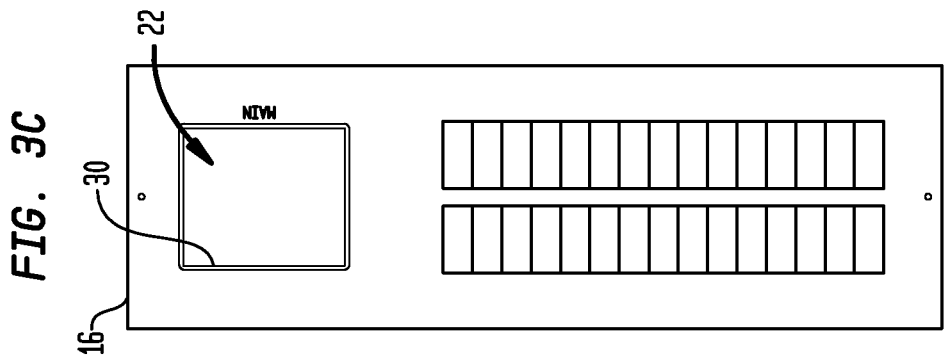
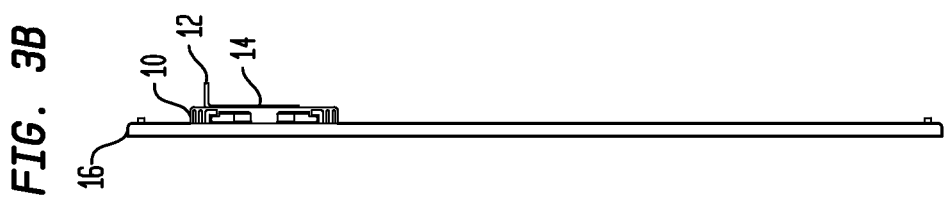
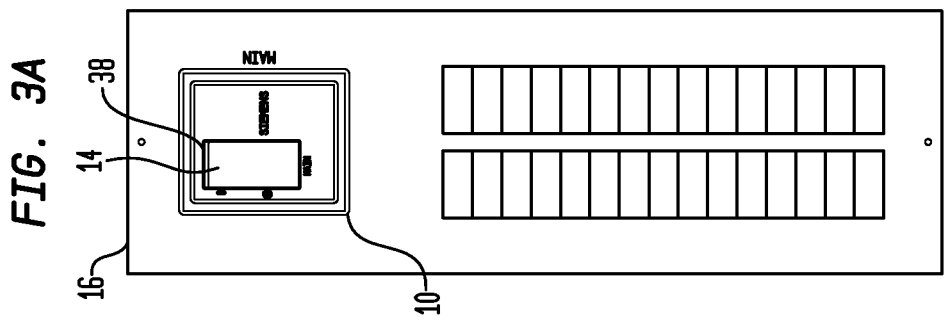

BREAKER TRAY FOR A PANELBOARD COVER

CROSS REFERENCE TO RELATED APPLICATIONS

This application claims the benefit under 35 U.S.C. §119 (e) of U.S. Provisional Application No. 61/302,287 entitled BREAKER TRAY, filed on Feb. 8, 2010 which is incorporated herein by reference in its entirety and to which this application claims the benefit of priority.

FIELD OF THE INVENTION

This invention relates to panelboards, and more particularly, to a breaker tray for a panelboard cover that enables conversion of the cover from one that is suitable for use with a main lug panelboard to a cover suitable for a main breaker panelboard.

BACKGROUND OF THE INVENTION

Panelboards and load centers used in electrical distribution systems typically include a deadfront, door, trim or other type of cover which is mounted to an enclosure. The cover is typically fabricated from sheet metal and includes removeable sections known as twistouts each of which, when removed, provide an opening for a handle of a device such as a circuit breaker to enable operation of the circuit breaker.

The twistouts are generally configured as rectangularly shaped sheet metal blanks. Each twistout is attached to the cover by a metal tab. During installation, the twistouts are manually removed from the cover by a contractor or electrician by repeatedly bending or twisting the metal tab until the tab breaks thus separating the twistout from the cover and forming an opening. This allows the circuit breaker handle to protrude through the opening and enables assembly of cover to the panelboard enclosure. Removal of the twistouts is a difficult and labor intensive operation and requires the use of special tools.

A panelboard may be configured as either a main lug panelboard or a main breaker panelboard each having different cover configurations. In particular, the cover used in a main breaker panelboard includes an opening for accommodating a breaker handle whereas the cover used in a main lug panelboard does not have the opening. Therefore, manufacturers typically provide two different types of covers in order to accommodate each panelboard configuration.

During on-site installation of an electrical distribution system, it is frequently desirable to convert a cover originally configured for a main lug panelboard to a cover which is suitable for a main breaker panelboard. This requires that an opening be manually cut into the main lug cover by an installer. However, this is also labor intensive and in many instances cannot be done in the field. In order to facilitate the conversion, manufacturers also supply covers having a twistout section for creating an opening in the cover. These types of covers may be used in either a main lug panelboard configuration wherein the twistout is left in place, or in a main breaker configuration wherein the twistout is removed to form an opening for accommodating a breaker handle. As previously described however, removal of a twistout is a difficult and labor intensive operation and requires the use of special tools.

Therefore, there is a need for a cover which reduces the amount of labor needed to form openings for accommodating a handle of a device, such as a circuit breaker, and wherein the opening may be formed without the use of special tools.

SUMMARY OF THE INVENTION

A cover for use with a panelboard enclosure is disclosed. The cover includes a cover element for mounting onto the panelboard enclosure. The cover element further includes an insert which is inserted into a cover element opening. A plate section is attached to the insert along peripheral edges of the plate section by a thin wall section sized to enable separation of the plate section from the insert to thereby provide a tray opening to accommodate a handle of an electrical device.

BRIEF DESCRIPTION OF THE DRAWINGS

FIG. 1d depicts a front view of the breaker tray and a tray opening.

FIGS. 3a-3b depict front and side views, respectively, of the breaker tray assembled into a cover for use with a panelboard.

FIG. 3c depicts the cover and a cover opening for receiving the breaker tray.

DESCRIPTION OF THE INVENTION

Figure 1A:
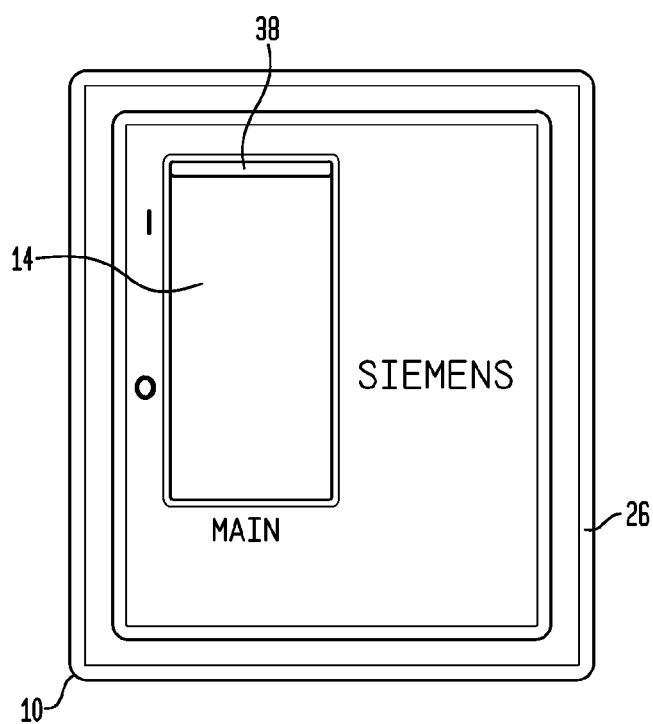
FIGS. 1a-1c depict front, side and bottom views of a breaker tray.

Before any embodiments of the invention are explained in detail, it should be understood that the invention is not limited in its application to the details of construction and the arrangement of components set forth in the following description or illustrated in the following drawings. The invention is capable of other embodiments and of being practiced or of being carried out in various ways. Also, it should be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings. In the description below, like reference numerals and labels are used to describe the same, similar or corresponding parts in the several views of FIGS. 1-5.

Figure 1B:
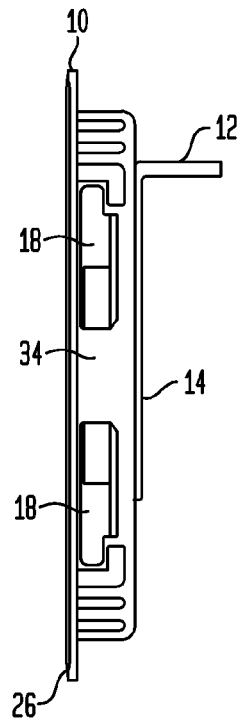
Figure 1C:
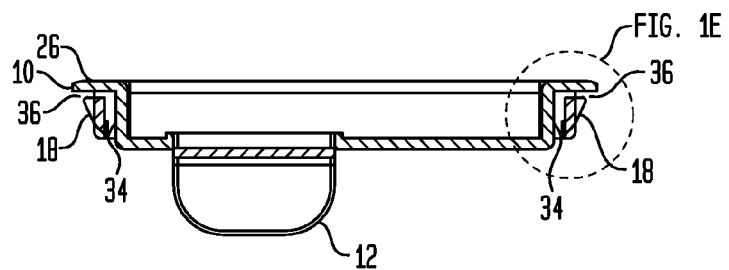

Referring to FIGS. 1a-1b, front and side views, respectively, of a breaker tray 10 in accordance with the present invention are shown. FIG. 1c depicts a cross sectional bottom view of the breaker tray 10. The breaker tray 10 has a substantially rectangular shape and includes a plate section 14 having a pull tab 12. The plate section 14 covers a tray opening 21 (see FIG. 1d) in the breaker tray 10 which is sized to enable a handle of a device used in an electrical distribution system, such as a handle of a main breaker, to protrude through the tray opening 21 to enable operation of the main breaker.

Figure 2B:
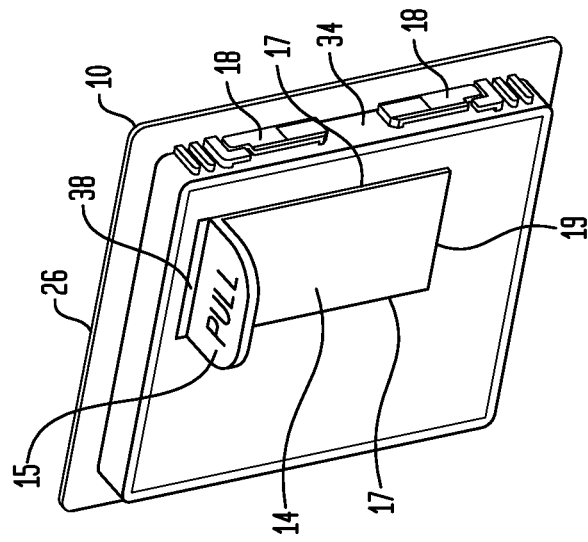
FIGS. 2a-2b depict left and right rear perspective views of the breaker tray.
Figure 2A:
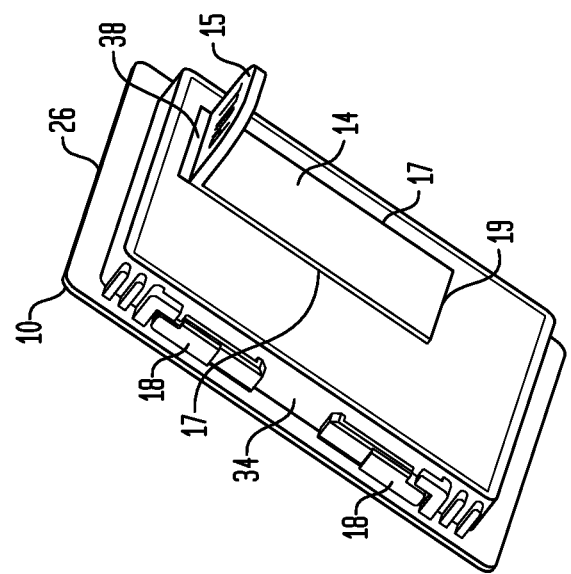
Figure 2D:
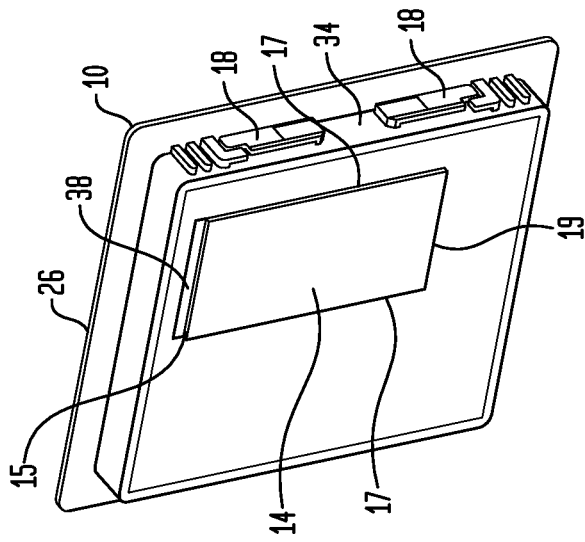
FIGS. 2c-2d depict left and right rear perspective views of an alternate embodiment of the breaker tray.
Figure 2C:
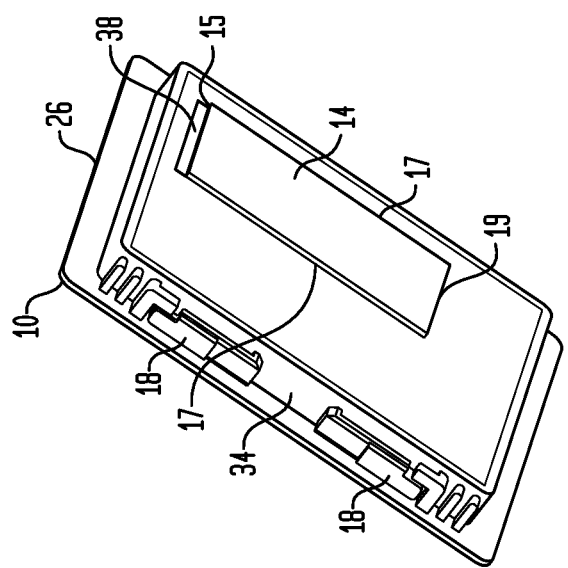

Referring to FIGS. 2a-2b, left and right rear perspective views of the breaker tray 10 are shown. The breaker tray 10 may be fabricated from a nonmetallic material that has suitable flexibility and impact properties such as plastic. Peripheral side 17 and bottom 19 edges of the plate section 14 are attached to the breaker tray 10 by a thin wall section that is sized and configured relative to the plate section 14 such that pulling on the pull tab 12 in a downward direction causes the plate section 14 to separate from the breaker tray 10 to thus provide the tray opening 21. A panel gap 38 may be formed between a top edge 15 of the plate section 14 and the breaker tray 10 to assist in removal of the plate section 14. In one embodiment, the plate section 14 may include perforations to assist in removal of the plate section 14. Referring to FIGS. 2c-2d, an alternate embodiment of the breaker tray 10 is shown wherein the plate section 14 does not include the pull tab 12. In this embodiment, an operator simply pushes on the plate section 14 with a finger to thus separate the plate section 14 from the breaker tray 10 and provide the tray opening 21.

Referring to FIGS. 3a-3b, front and side views, respectively, are shown of the breaker tray 10 assembled into a cover 16 for use with a panelboard. The panelboard may be either a main lug panelboard or a main breaker panelboard. The cover 16 may be either metallic or non-metallic and serves as a barrier between electrical elements within an enclosure and an operator. The cover 16 includes a cover opening 22 (see FIG. 3c) defined by edges 30 to form a substantially rectangular shape for receiving the breaker tray 10. The cover opening 22 is formed by a die or tool during manufacture of the breaker tray 10 at a factory.

FIG. 3a depicts the cover 16 in a configuration suitable for use with a main lug panelboard wherein the plate section 14 is not removed from the breaker tray 10. Removal of the plate section 14 from the breaker tray 10 provides the tray opening 21 (see FIG. 1d) through which a breaker handle protrudes to enable manual operation of the breaker (i.e. switching the breaker on/off) as needed without physically removing the cover 16. This converts the cover 16 to a configuration which is suitable for use with a main breaker panelboard.

Therefore, the cover 16 may be used in either a main lug panelboard configuration wherein the plate section 14 is left in place, or in a main breaker configuration wherein the plate section 14 is removed to provide the opening 21 for accommodating a breaker handle. It is frequently desirable to convert a cover originally configured for a main lug panelboard to a cover which is suitable for a main breaker panelboard during an on-site installation of an electrical distribution system. The current invention enables the cover 16 to be quickly converted from a main lug application to a main breaker application without the use of specialized tools. As a result, a manufacturer only needs a single cover manufactured in accordance with the present invention rather than separate covers for each configuration, thus simplifying supply chain management.

Figure 1E:
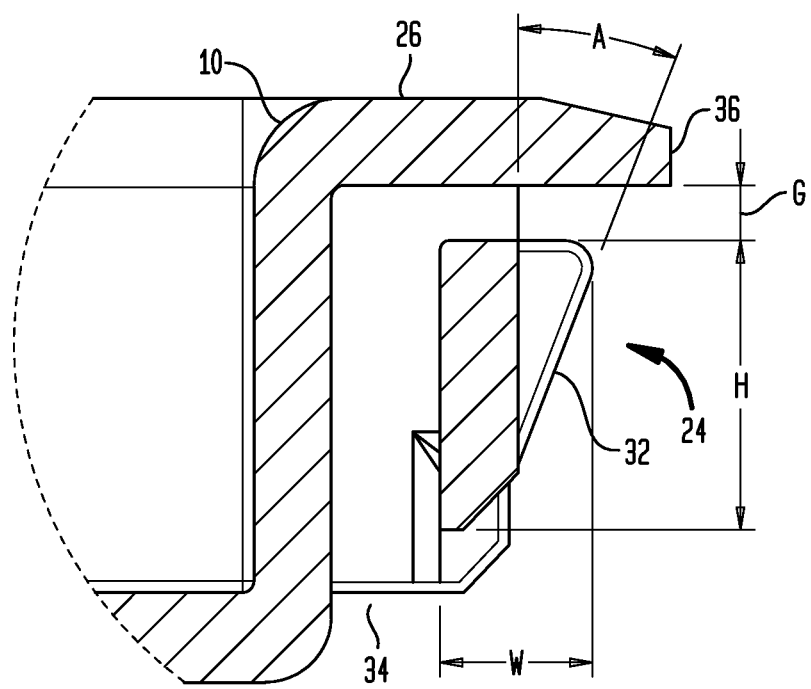
FIG. 1e is an enlarged view of balloon section 1 in FIG. 1c and depicts a snap.

Referring back to FIG. 1c, the breaker tray 10 further includes snap elements 18 located on sides 34 of breaker tray 10. The snap elements 18 are used to secure the breaker tray 10 to the cover 16. FIG. 1e is enlarged view of balloon section 1 of FIG. 1c and depicts an exemplary snap element 24. The snap element 24 is spaced apart from a flange 26 to form a tray gap 36 having a height C for receiving the edge 30 of the cover 16. The snap element 24 has a height H, width W and a sloping portion 32 having an angle A. In one embodiment, gap G is approximately 0.060 in., height H is approximately 0.312 in., width W is approximately 0.180 in. and angle A is approximately 22.6 degrees. In one embodiment, the breaker tray 10 includes four snap elements 18.

Figure 4:
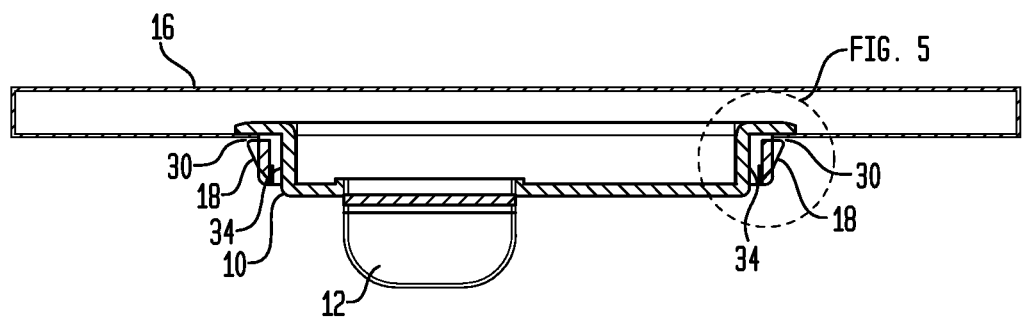
FIG. 4 is a bottom cross sectional view of the breaker tray installed in the cover.
Figure 5:
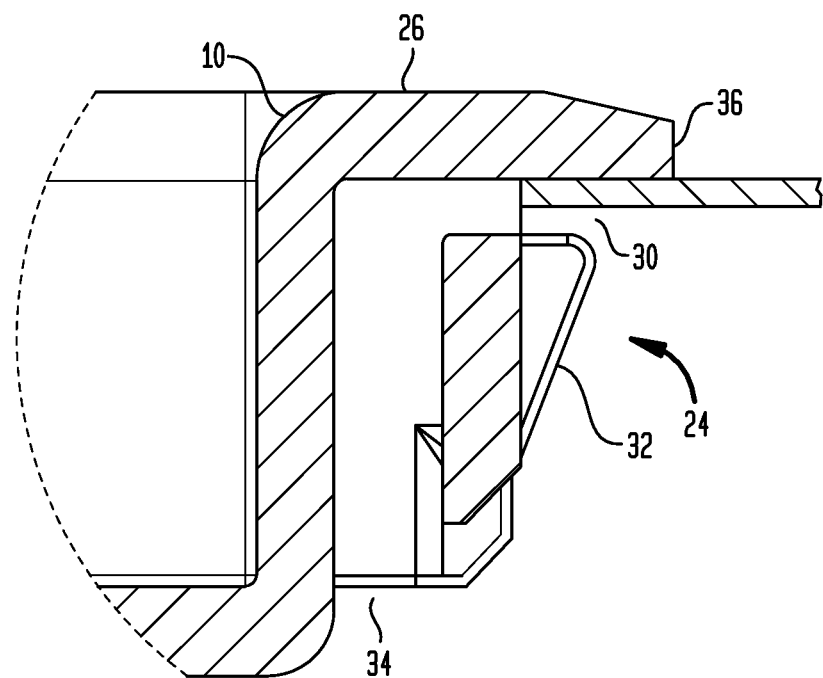
FIG. 5 is an enlarged view of balloon section 5 of FIG. 4 and depicts an edge of the cover inserted into a tray gap.

Referring to FIG. 4, a bottom cross sectional view of the breaker tray 10 installed in the cover 16 is shown. FIG. 5 is an enlarged view of balloon section 5 of FIG. 4 and depicts the edge 30 of cover 16 inserted into the tray gap 36. The breaker tray 10 is assembled into the cover 16 by applying a downward force to the breaker tray 10 in a direction substantially perpendicular to the cover 16. This causes contact between sloping portion 32 and the edge 30, thus causing the snap element 24 to deflect to enable insertion of the breaker tray 10 into the cover opening 22. After the edge 30 moves past the sloping portion 32 and into the tray gap 36, the snap element 24 returns to its original shape thus capturing the edge 30 within the tray gap 36 and securing the breaker tray 10.

While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations.

What is claimed is:

1. A cover for use with a panelboard enclosure; comprising:
   a cover element for mounting onto said panelboard enclosure, said cover element having a cover opening;
   an insert for insertion into said cover opening; and
   a plate section having a peripheral edge wherein an entire first portion of said peripheral edge is attached to said insert by a thin wall section sized to enable separation of said plate section from said insert and wherein a second portion of said peripheral edge is spaced apart from said insert to form a gap between said second portion and said insert to thereby facilitate separation of said plate section from said insert to provide a tray opening for accommodating a handle of an electrical device.

2. The cover according to claim 1 wherein said plate section further includes a pull tab.

3. The cover according to claim 1 further including snap elements for securing said insert to said cover element.

4. The cover according to claim 3 wherein said snap elements each include a sloping portion which deflects during insertion of said insert.

5. The cover according to claim 4 further including a tray gap located between each said snap element and a flange of said insert for receiving edges of said cover opening.

6. The cover according to claim 1 wherein said insert is fabricated from plastic.

7. The cover according to claim 1 wherein said electrical device is a main breaker.

8. A cover for use with a panelboard enclosure, comprising:
   a cover element for mounting onto said panelboard enclosure, said cover element having a cover opening;
   an insert for insertion into said cover opening; and
   a plate section having a peripheral edge where an entire first portion of said peripheral edge is attached to said insert by a thin wall section and wherein a second portion of said peripheral edge is spaced apart from said insert forming a gap between said second portion and said insert to form, a cover suitable for use with a main lug panelboard configuration wherein said thin wall section is sized to enable separation of said plate section to form a cover suitable for use with a main breaker panelboard configuration.

9. The cover according to claim 8 wherein said plate section further includes a pull tab.

10. The cover according to claim 8 further including snap elements for securing said insert to said cover element.

11. The cover according to claim 10 wherein said snap elements each include a sloping portion which deflects during insertion of said insert.

12. The cover according to claim 10 further including a tray gap located between each said snap element and a flange of said insert for receiving edges of said cover opening.

13. The cover according claim 8 wherein said insert is fabricated from plastic.

14. The cover according to claim 8 wherein separation of said plate section provides a tray opening for accommodating a handle of a main breaker.

15. A method for converting a cover used with a panelboard enclosure, comprising the steps of:

providing, a cover element having an insert, wherein said cover element is suitable for use with a main panelboard configuration;

providing a plate section having a peripheral edge wherein an entire first portion of said peripheral edge is attached to said insert by a thin wall section sized to enable separation of said plate section from said insert and wherein a second portion of said Peripheral edge is spaced apart from said insert to form a gap between said second portion and said insert to thereby facilitate separation of said plate section from said insert; and removing said plate section to provide an opening for a handle of a main breaker to form a cover element suitable for use with a main breaker panelboard configuration.

16. The method according to claim 15, wherein a pull tab is used in said removing step.

17. The method according to claim 15, further including snap elements for securing said insert to said cover element.

18. The method according to claim 17, wherein said snap elements each include a sloping portion which deflects during insertion of said insert.

* * * * *